(12) United States Patent
Inoue et al.

(10) Patent No.: US 11,255,581 B2
(45) Date of Patent: Feb. 22, 2022

(54) FREE PISTON STIRLING REFRIGERATOR

(71) Applicant: Twinbird Corporation, Tsubame (JP)

(72) Inventors: Mineyuki Inoue, Tsubame (JP); Kazuya Tsuji, Tsubame (JP); Jun Komada, Tsubame (JP)

(73) Assignee: Twinbird Corporation, Tsubame (JP)

( * ) Notice: Subject to any disclaimer, the term of this patent is extended or adjusted under 35 U.S.C. 154(b) by 0 days.

(21) Appl. No.: 17/123,590

(22) Filed: Dec. 16, 2020

(65) Prior Publication Data
US 2021/0190387 A1    Jun. 24, 2021

(30) Foreign Application Priority Data

Dec. 24, 2019 (JP) .............................. JP2019-232614

(51) Int. Cl.
| | | |
|---|---|---|
| *F25B 9/14* | (2006.01) | |
| *F02G 1/043* | (2006.01) | |
| *F02G 1/045* | (2006.01) | |
| *F25B 49/00* | (2006.01) | |
| *H02P 27/06* | (2006.01) | |

(Continued)

(52) U.S. Cl.
CPC ................ *F25B 9/14* (2013.01); *F02G 1/045* (2013.01); *F02G 1/0435* (2013.01); *F25B 49/00* (2013.01); *F02G 2275/00* (2013.01); *F25B 2309/001* (2013.01); *F25B 2700/15* (2013.01); *H02P 27/04* (2013.01); *H02P 27/06* (2013.01); *H02P 29/024* (2013.01); *H02P 29/026* (2013.01)

(58) Field of Classification Search
CPC ........ F25B 2309/001; F25B 2309/1428; F02G 1/04–06; H02P 27/04; H02P 27/06
USPC .......... 318/635, 650, 71, 400, 22, 434; 62/6
See application file for complete search history.

(56) References Cited

U.S. PATENT DOCUMENTS 3,540,287 A * 11/1970 Maidanik ................ G01L 11/04
                                                                    73/703
4,661,756 A *  4/1987 Murphy .................. H02P 25/08
                                                                    310/168

(Continued)

FOREIGN PATENT DOCUMENTS

| JP | 56139084 A | * 10/1981 | .............. H02M 7/48 |
| JP | 60059979 A | *  4/1985 | .............. H02M 7/48 |

(Continued)

*Primary Examiner* — Mark A Laurenzi
*Assistant Examiner* — Mickey H France
(74) *Attorney, Agent, or Firm* — Leason Ellis LLP

(57) ABSTRACT

A free piston Stirling refrigerator of the present invention has a cylinder provided inside a casing; a piston and a displacer that are provided in a way such that they are capable of reciprocating inside the cylinder; a linear motor for reciprocating the piston; and a control unit for controlling the operation of the linear motor. Particularly, the control unit has an inverter circuit for generating an alternating current with a given frequency and then supplying the alternating current to the linear motor; a current detection circuit for detecting the current outputted from the inverter circuit; and a control circuit for controlling the output from the inverter circuit based on a turbulence in the current detected by the current detection circuit. Thus, collisions between the piston and the displacer (i.e. hitting) can be restricted through an inexpensive configuration and a simple control.

2 Claims, 7 Drawing Sheets

(51) Int. Cl.
*H02P 29/024* (2016.01)
*H02P 27/04* (2016.01)

(56) References Cited

U.S. PATENT DOCUMENTS

| | | | | |
|---|---|---|---|---|
| 4,678,971 A * | 7/1987 | Kanazawa | H02K 41/031 | 310/12.19 |
| 4,765,150 A * | 8/1988 | Persem | F16D 3/68 | 62/215 |
| 4,862,695 A * | 9/1989 | Kushnir | F02G 1/0435 | 62/6 |
| 4,953,109 A * | 8/1990 | Burgis | B30B 9/3007 | 100/49 |
| RE33,620 E * | 6/1991 | Persem | F25B 49/025 | 62/215 |
| 5,088,288 A * | 2/1992 | Katagishi | F25B 9/14 | 62/228.1 |
| 5,658,132 A * | 8/1997 | Akazawa | B60H 1/3222 | 318/803 |
| 5,893,275 A * | 4/1999 | Henry | F25J 3/04981 | 62/615 |
| 5,929,538 A * | 7/1999 | O'Sullivan | H02J 7/1415 | 307/66 |
| 8,093,858 B1 * | 1/2012 | Kadah | H02P 1/42 | 318/786 |
| 9,068,901 B1 * | 6/2015 | Pauly | H02M 3/1584 | |
| 2001/0056330 A1 * | 12/2001 | Wills | H02J 3/383 | 702/60 |
| 2003/0108430 A1 * | 6/2003 | Yoshida | F04B 49/065 | 417/44.11 |
| 2004/0088999 A1 * | 5/2004 | Unger | F25B 9/14 | 62/6 |
| 2004/0108824 A1 * | 6/2004 | Ueda | H02P 25/032 | 318/114 |
| 2005/0028520 A1 * | 2/2005 | Chertok | F02G 1/043 | 60/517 |
| 2005/0031470 A1 * | 2/2005 | Lee | F04B 35/045 | 417/416 |
| 2005/0039454 A1 * | 2/2005 | Shimizu | F02G 1/0435 | 60/595 |
| 2005/0120721 A1 * | 6/2005 | O'Baid | F25B 9/14 | 62/6 |
| 2005/0223715 A1 * | 10/2005 | Kim | F25B 9/14 | 62/6 |
| 2007/0256428 A1 * | 11/2007 | Unger | F16F 15/02 | 62/6 |
| 2008/0150456 A1 * | 6/2008 | Heo | F25B 49/025 | 318/119 |
| 2010/0182809 A1 * | 7/2010 | Cullinane | H02P 9/02 | 363/34 |
| 2011/0194318 A1 * | 8/2011 | Kono | H02M 7/53875 | 363/37 |
| 2013/0300334 A1 * | 11/2013 | Tooyama | H02M 1/12 | 318/504 |
| 2014/0091622 A1 * | 4/2014 | Lucas | H02J 3/383 | 307/19 |
| 2014/0117910 A1 * | 5/2014 | Le | G01R 31/42 | 318/490 |
| 2014/0202172 A1 * | 7/2014 | Kim | F25B 9/145 | 62/6 |
| 2014/0290282 A1 * | 10/2014 | Kuwajima | B01D 8/00 | 62/55.5 |
| 2015/0131187 A1 * | 5/2015 | Krein | H02S 50/00 | 361/67 |
| 2016/0181809 A1 * | 6/2016 | Chiang | H02J 3/32 | 307/82 |
| 2016/0252280 A1 * | 9/2016 | Suzuki | F28D 1/0226 | 62/6 |
| 2017/0051590 A1 * | 2/2017 | Panchbhai | E21B 43/128 | |
| 2017/0152846 A1 * | 6/2017 | Ryu | F04B 49/065 | |
| 2017/0152850 A1 * | 6/2017 | Ryu | F04B 39/0005 | |
| 2017/0254570 A1 * | 9/2017 | Veprik | F25B 9/14 | |
| 2017/0257043 A1 * | 9/2017 | Lorilla | H02P 27/08 | |
| 2018/0083565 A1 * | 3/2018 | Saha | H02M 7/5395 | |
| 2018/0202430 A1 * | 7/2018 | Jung | F04B 49/06 | |
| 2018/0316297 A1 * | 11/2018 | Uemura | H02P 27/085 | |
| 2020/0144963 A1 * | 5/2020 | Mirra | H02J 3/381 | |
| 2020/0217568 A1 * | 7/2020 | Tauber | F25B 49/022 | |
| 2020/0225655 A1 * | 7/2020 | Cella | G06N 3/0472 | |
| 2021/0028737 A1 * | 1/2021 | Sozer | H02P 25/098 | |
| 2021/0033313 A1 * | 2/2021 | Veprik | F25B 9/14 | |
| 2021/0157312 A1 * | 5/2021 | Cella | G06N 20/00 | |
| 2021/0190387 A1 * | 6/2021 | Inoue | F25B 9/14 | |
| 2021/0194356 A1 * | 6/2021 | Afridi | H02M 3/1582 | |

FOREIGN PATENT DOCUMENTS

| | | | |
|---|---|---|---|
| JP | 63124795 A | * | 5/1988 |
| JP | H0744875 B2 | * | 5/1995 |
| JP | 09260099 A | * | 10/1997 |
| JP | 2003-014322 A | | 1/2003 |
| JP | 2004100640 A | * | 4/2004 |
| JP | 2004229488 A | * | 8/2004 |
| JP | 2005-337551 A | | 12/2005 |
| JP | 2006149110 A | * | 6/2006 |

* cited by examiner

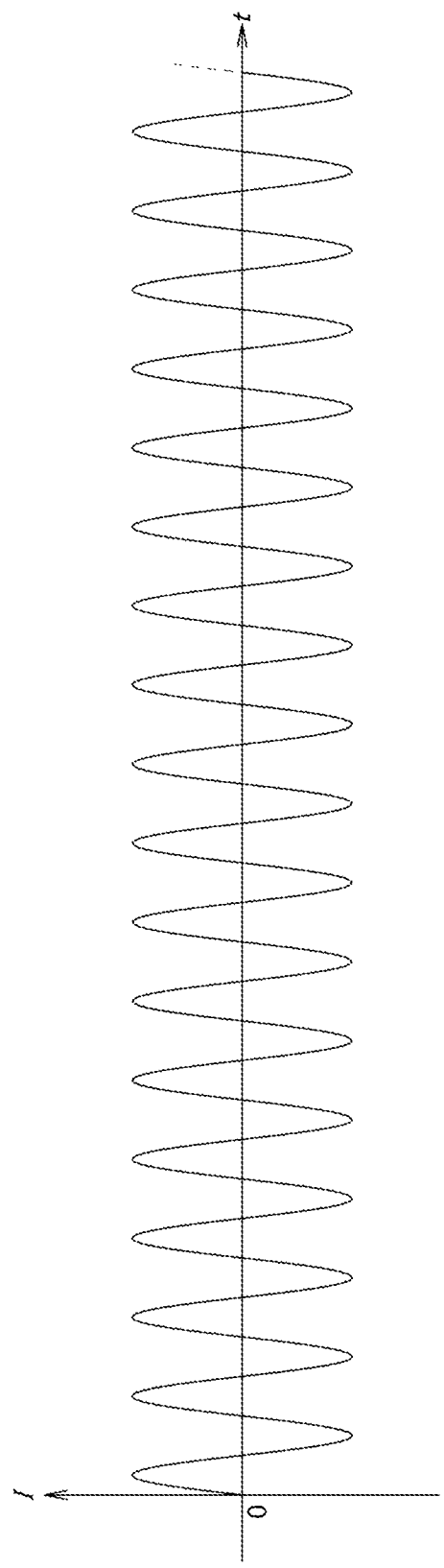
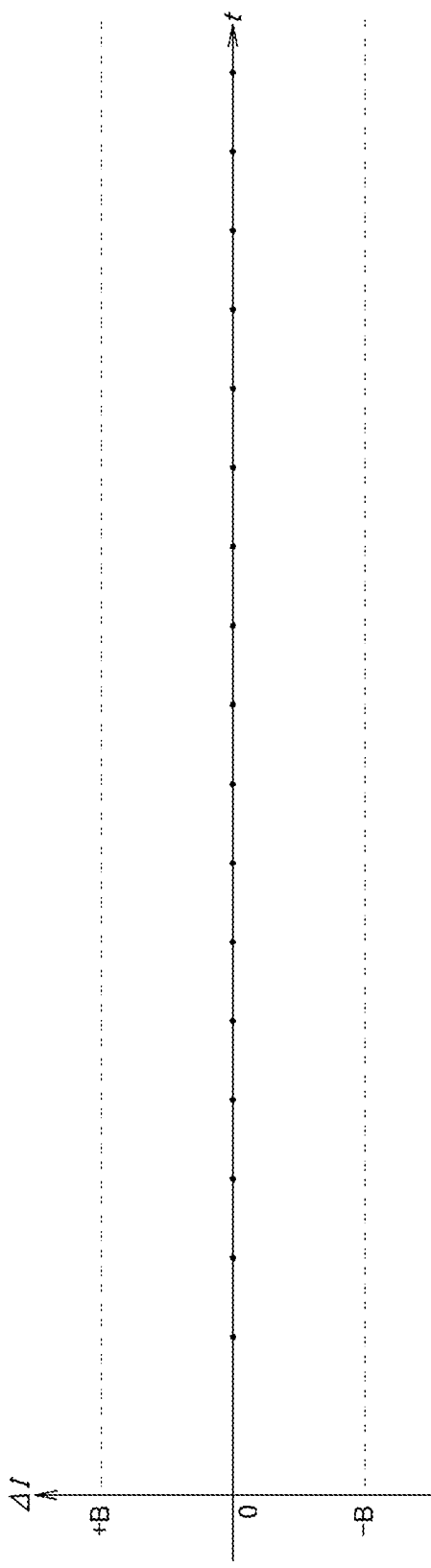

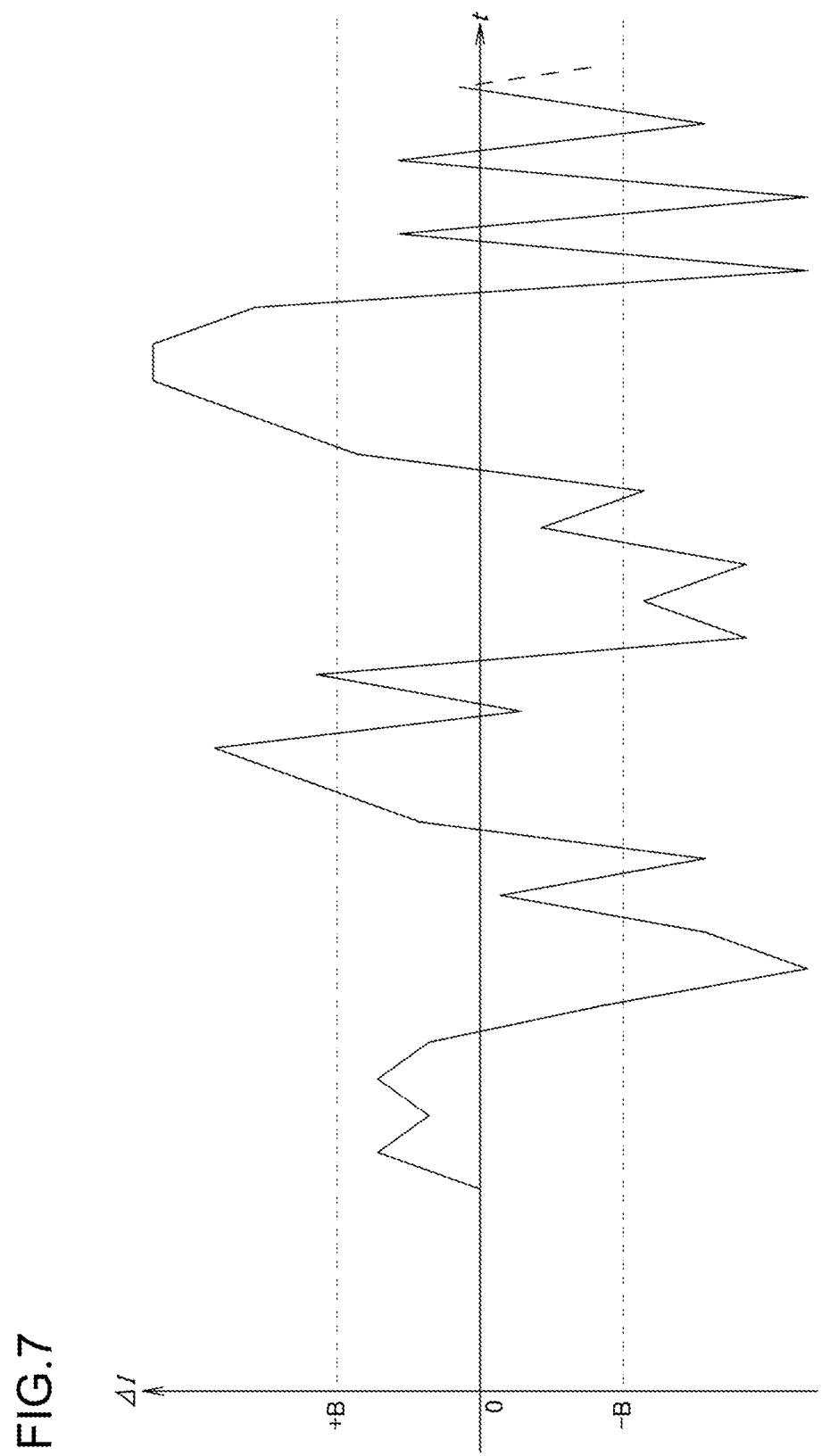

FREE PISTON STIRLING REFRIGERATOR

This application claims the benefit of priority to Japanese Patent Application No. 2019-232614 filed on Dec. 24, 2019, the content of which is incorporated herein by reference in its entirety.

BACKGROUND OF THE INVENTION

Field of the Invention

The present invention relates to a free piston Stirling refrigerator, particularly to a free piston Stirling refrigerator in which a piston and a displacer directly face each other across a compression chamber.

Background Art

Conventionally, as such a kind of free piston Stirling refrigerator, there is known a refrigerator(s) having a casing; a cylinder provided inside the casing; a piston provided in a way such that the piston is capable of reciprocating inside the cylinder; a linear motor for reciprocating the piston; a displacer reciprocating inside the cylinder in conjunction with the reciprocation of the piston; and a control unit for controlling the operation of the linear motor (e.g. JP-A-2005-337551 and JP-A-2003-14322). In such free piston Stirling refrigerator(s), the amplitude of the piston is not constant, but varies depending on, for example, an electric power supplied to the linear motor. Similarly, the amplitude of the displacer is not constant as well, but varies depending on, for example, the electric power supplied to the linear motor. Here, the amplitudes of the piston and the displacer also vary depending on, for example, the temperatures of a heat-absorbing part and a heat-releasing part. Thus, in JP-A-2005-337551, the electric power supplied to the linear motor is controlled based on the temperatures of the heat-absorbing and heat-releasing parts, thereby restricting a collision between the piston and the displacer; or collisions of the piston and/or displacer with other parts (referred to as "hitting" hereunder). Further, in JP-A-2003-14322, the positions of the piston and the displacer are continuously calculated, and the electric power supplied to the linear motor is then controlled based on the calculation results, thereby restricting hitting. Particularly, in JP-A-2003-14322, since the positions of the piston and the displacer are calculated in a continuous manner, required are a current and voltage detection unit, a capacitance detection unit, an optical sensor or the like.

SUMMARY OF THE INVENTION

However, problems with these free piston Stirling refrigerators are that there are required units for detecting physical quantities for control, and that calculations tend to be complex. For these reasons, there has also been a problem that the system of a free piston Stirling refrigerator may become complex and expensive.

It is an object of the present invention to solve the above problems by providing a free piston Stirling refrigerator capable of restricting hitting through a simple and inexpensive configuration.

A free piston Stirling refrigerator of a first aspect of the present invention has: a casing; a cylinder provided inside the casing; a piston provided in a way such that the piston is capable of reciprocating inside the cylinder; a linear motor for reciprocating the piston; a displacer reciprocating inside the cylinder in conjunction with the reciprocation of the piston; and a control unit for controlling an operation of the linear motor. Particularly, the control unit has: an inverter circuit for generating an alternating current with a given frequency and then supplying the alternating current to the linear motor; a current detection circuit for detecting the alternating current outputted from the inverter circuit; and a control circuit for controlling the alternating current outputted from the inverter circuit based on a turbulence in the alternating current that is detected by the current detection circuit.

Further, a free piston Stirling refrigerator of a second aspect of the invention is based on that of the first aspect and is configured in a manner such that the control circuit calculates a difference value by comparing a waveform detected by the current detection circuit and a reference waveform per one cycle of the alternating current outputted by the inverter circuit, and the difference value is used as a reference for judging the turbulence in the alternating current.

Furthermore, a free piston Stirling refrigerator of a third aspect of the invention is based on that of the second aspect and is configured in a manner such that the control circuit calculates a one cycle reference waveform by averaging waveforms of n cycles of the alternating current detected.

Furthermore, a free piston Stirling refrigerator of a fourth aspect of the invention is based on that of the third aspect and is configured in a manner such that the control circuit compares the one cycle reference waveform with each of the next waveforms of n cycles of an alternating current detected that are subsequent to the waveforms of n cycles of the alternating current serving as the basis for calculating the reference waveform, and calculates the next one cycle reference waveform by averaging said next waveforms of n cycles of the alternating current.

Since the free piston Stirling refrigerator described in the first aspect of the invention is configured in the above manner, the output to the linear motor can be controlled based on the turbulence in the current detected by the current detection circuit, thus allowing hitting to be restricted through an inexpensive configuration and a simple control.

Here, the control circuit calculates the difference value by comparing the waveform detected by the current detection circuit and the reference waveform per one cycle of the alternating current outputted by the inverter circuit, and this difference value is used as a reference for judging the turbulence in the current, thereby allowing hitting to be restricted via a simple calculation.

Furthermore, the control circuit calculates the one cycle reference waveform by averaging waveforms of n cycles of the alternating current detected, thus allowing hitting to be restricted likewise in a stable manner even when a condition for stability varies due to, for example, an operating strength and surrounding temperatures.

Furthermore, the control circuit compares the one cycle reference waveform with each of the next waveforms of n cycles of the alternating current detected that are subsequent to the waveforms of n cycles of the alternating current serving as the basis for calculating the reference waveform, and calculates the next reference waveform by averaging said next waveforms of n cycles of the alternating current. In this way, hitting can be restricted likewise in a stable manner even when the condition for stability changes as a result of, for example, adjusting the operating strength or due to changes in surrounding temperatures or the like.

BRIEF DESCRIPTION OF THE DRAWINGS

FIG. 3A is an explanatory diagram showing a current waveform in an ideal state in the free piston Stirling refrigerator of the embodiment of the present invention.

FIG. 3B is an explanatory diagram showing a turbulence in the current waveform shown in FIG. 3A.

FIG. 7 is an explanatory diagram showing the turbulence in the current based on the waveform shown in FIG. 6 in the free piston Stirling refrigerator of the embodiment of the present invention.

DETAILED DESCRIPTION OF THE INVENTION

Figure 1:
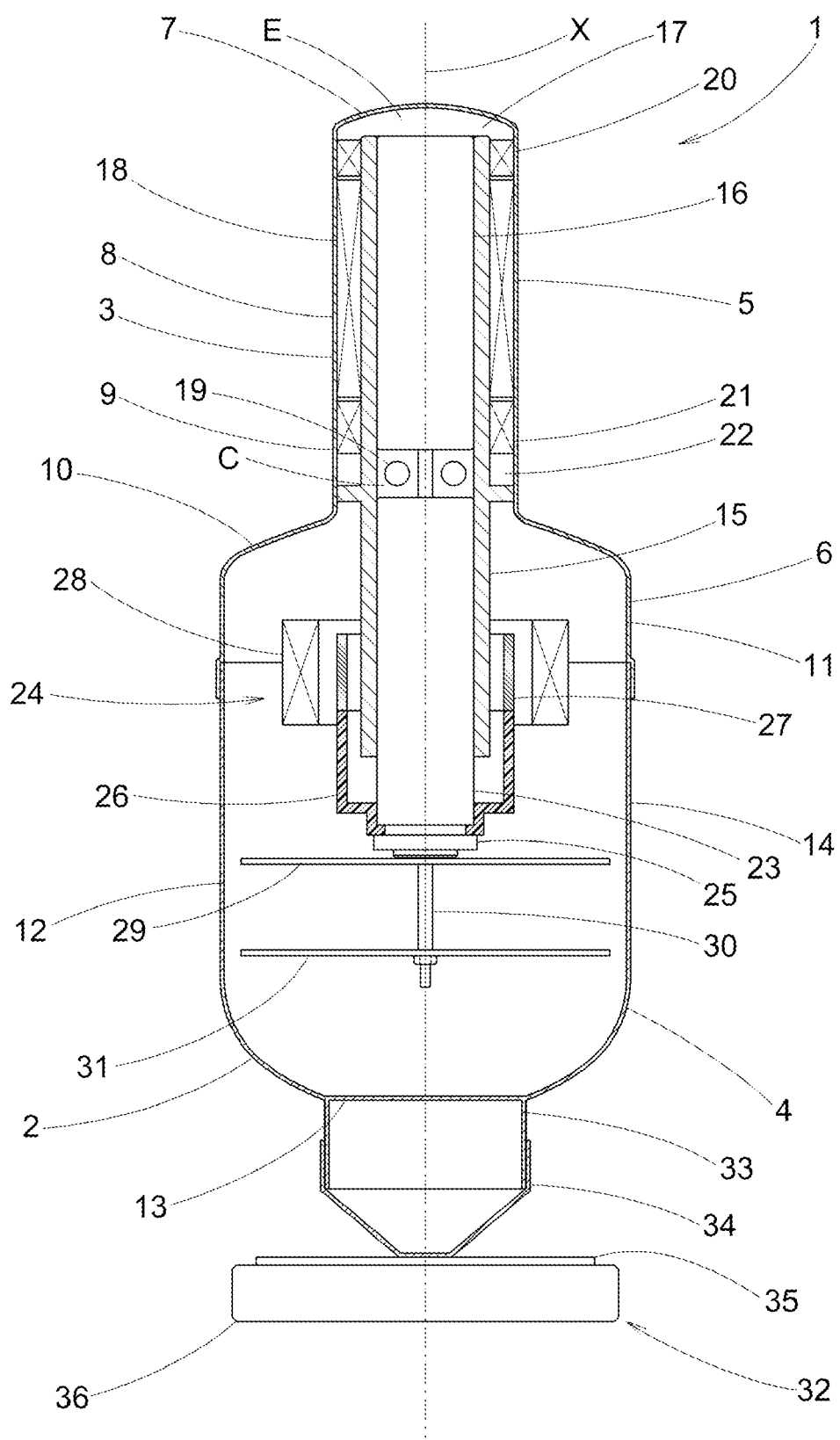
FIG. 1 is a cross-sectional view showing a free piston Stirling refrigerator of an embodiment of the present invention.

An embodiment of the present invention is described hereunder based on FIGS. 1 to 7. A numerical symbol "1" indicates a free piston Stirling refrigerator. This Stirling refrigerator 1 has a metal casing 2. Further, this casing 2 has a first casing body 3 and a second casing body 4. The first casing body 3 integrally has a cylindrical portion 5 formed into the shape of a small-diameter cylindrical body; and a large-diameter portion 6 whose base end is open. Moreover, the cylindrical portion 5 has a closed tip end portion 7, an intermediate portion 8 and a base portion 9. In addition, the large-diameter portion 6 has a first end surface portion 10 formed into the shape of a substantially circular protruding curved surface; and a side surface portion 11 having a short cylindrical shape. Similarly, the second casing body 4 has a cylindrical side surface portion 12; and a second end surface portion 13 formed into the shape of a substantially circular protruding curved surface. Further, a cylindrical trunk portion 14 is formed of the large-diameter portion 6 and the second casing body 4.

Inserted in the cylindrical portion 5 is a cylinder 15 that is extended to the inner region of the trunk portion 14 and is coaxial with the cylindrical portion 5. That is, a central axis line X of the cylinder 15 is identical to a central axis line X of the cylindrical portion 5. Further, the cylinder 15 is formed of a metal. Furthermore, a displacer 16 is housed inside a tip end side of the cylinder 15 in a manner such that the displacer 16 is capable of sliding along the direction of the central axis line X. Furthermore, an expansion chamber E is established between the tip end of the displacer 16 and the tip end portion 7 of the cylindrical portion 5, the internal and external regions of the cylinder 15 are communicated with each other through a gap 17. Furthermore, at the intermediate portion 8, a regenerator 18 is provided between the inner circumference of the cylindrical portion 5 and the outer circumference of the cylinder 15; at the base portion 9, a communication hole 19 connecting the internal and external regions of the cylinder 15 is formed on the cylinder 15 itself. Furthermore, a heat-absorbing fin 20 is provided between the inner circumference of the tip end portion 7 of the cylindrical portion 5 and the outer circumference of the tip end of the cylinder 15; in between the regenerator 18 and the communication hole 19, a heat-releasing fin 21 is provided between the inner circumference of the cylindrical portion 5 and the outer circumference of the cylinder 15. Furthermore, there is established a path 22 starting from an inner tip end of the cylinder 15, and then passing through the gap 17, the heat-absorbing fin 20, the regenerator 18, the heat-releasing fin 21 and the communication hole 19 before arriving at a compression chamber C inside the cylinder 15. Furthermore, in the trunk portion 14, a piston 23 is housed inside a base end side of the cylinder 15 in a manner such that the piston 23 is capable of sliding along the direction of the central axis line X. Furthermore, a base end portion of this piston 23 is coaxially connected to a linear motor 24. Here, this linear motor 24 is configured in a way such that it has a short cylindrical frame 26 connected to the base end portion of the piston 23 through a connector 25 and coaxially extended to the outer circumference of the base end side of the cylinder 15; a cylindrical permanent magnet 27 fixed to one end of the frame 26; and an annular magnet coil 28 provided proximal to the outer circumference of the permanent magnet 27.

Further, a first leaf spring 29 for controlling the movement of the piston 23 is connected to the connector 25 for connecting the frame 26 to the piston 23. Furthermore, one end of a rod 30 for controlling the movement of the displacer 16 is connected to a base end side of the displacer 16, and a second leaf spring 31 is connected to the other end of the rod 30. Here, the rod 30 is extended along the direction of the central axis line X by penetrating the center of the piston 23. In addition, the first and second leaf springs 29, 31 are provided in the trunk portion 14 in a way such that they are arranged outside the base end side of the cylinder 15, and the second leaf spring 31 is arranged in a location more distant from the base end side of the cylinder 15 than the first leaf spring 29.

Here, a numerical symbol "32" in FIG. 1 indicates a vibration absorption unit provided on the second end surface portion 13 of the second casing body 4. This vibration absorption unit 32 is configured in a way such that a leaf spring 35 and a balance weight 36 are coaxially stacked together through an attachment portion 33 coaxial with the central axis line X of the cylinder 15 and a connecting portion 34 connected to the attachment portion 33.

Figure 2:
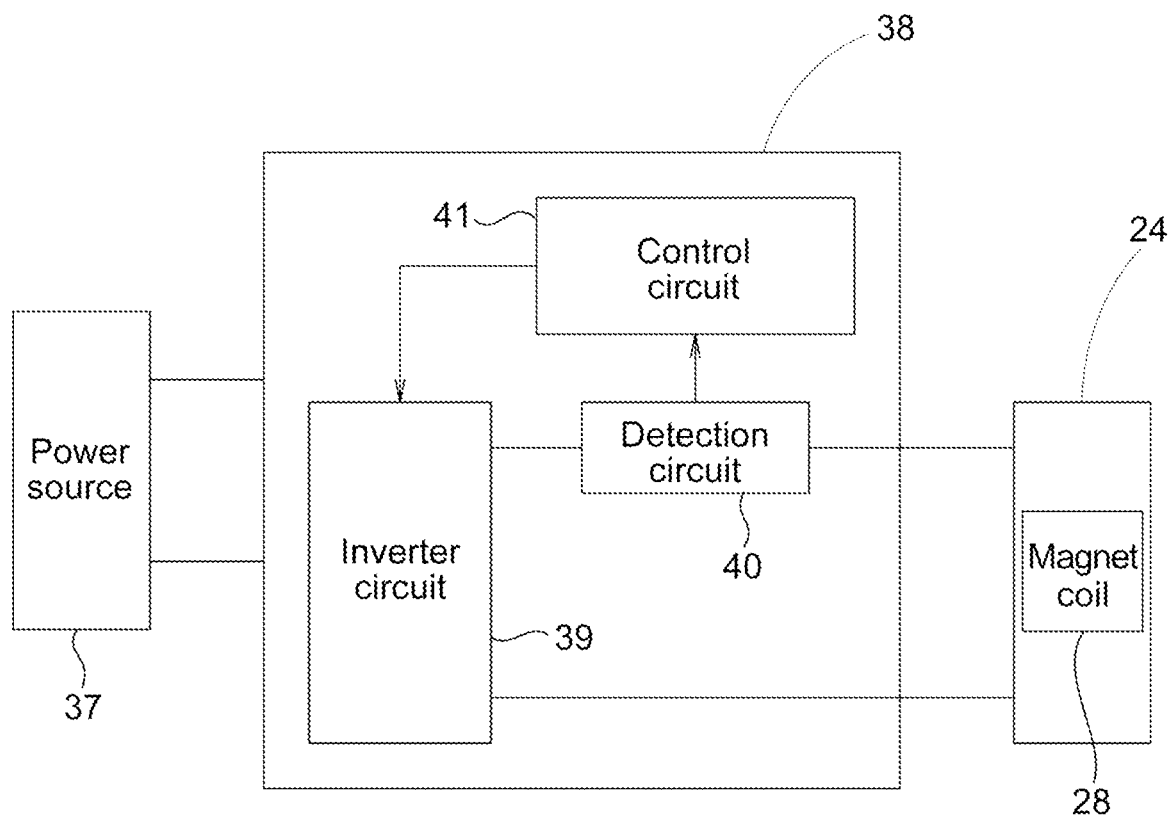
FIG. 2 is a simple block diagram showing an electric system of the free piston Stirling refrigerator of the embodiment of the present invention.

FIG. 2 is a simple block diagram showing an electric system of the Stirling refrigerator 1. This electric system has a power source 37 and a control unit 38. The electric power source 37 is a DC power source. Here, this DC power source may be a battery or the like, or may be a rectifier circuit with an AC power source. Further, the control unit 38 has an inverter circuit 39, a current detection circuit 40 and a control circuit 41. The inverter circuit 39 serves to convert a DC current from the power source 37 into an alternating current with a given frequency, and then supply the alternating current to the magnet coil 28 of the linear motor 24. Further, the current detection circuit 40 serves to detect a current outputted from the inverter circuit 39. Moreover, the control unit 41 serves to control an output from the inverter circuit 39 based on a turbulence in the current detected by the current detection circuit 40.

With such configuration, as a result of applying the alternating current generated by the inverter circuit 39 to the magnet coil 28, an alternating field will occur from the magnet coil 28. Due to this alternating field, there will be generated a force for reciprocating the permanent magnet 27 along the direction of the central axis line X. Due to this force, the piston 23 connected to the frame 26 with the permanent magnet 27 fixed thereto is capable of reciprocating in the cylinder 15 along the direction of the central axis line X. Thus, as the piston 23 moves closer to the displacer 16, a gas inside the compression chamber C formed between the piston 23 and the displacer 16 will be compressed, and then travel through the communication hole 19, the heat-releasing fin 21, the regenerator 18, the heat-absorbing fin 20 and the gap 17 before arriving at the expansion chamber E formed between the tip end of the displacer 16 and the tip end portion 7 of the cylindrical portion 5, thereby allowing the displacer 16 to be pushed down by a given phase difference with respect to the piston 23. In contrast, as the piston 23 moves away from the displacer 16, the pressure inside the compression chamber C will turn negative, and a gas inside the expansion chamber E will be discharged therefrom and then travel through the gap 17, the heat-absorbing fin 20, the regenerator 18, the heat-releasing fin 21 and the communication hole 19 before being refluxed to the compression chamber C, thereby allowing the displacer 16 to be pushed up by a given phase difference with respect to the piston 23. During such process, since a reversible cycle comprised of two isothermal changes and isovolumetric changes is carried out, low temperatures are observed in the vicinity of the expansion chamber E, whereas high temperatures are observed in the vicinity of the compression chamber C.

The alternating current supplied to the magnet coil 28 of the linear motor 24 from the inverter circuit 39 is detected by the current detection circuit 40. As long as the operation of the Stirling refrigerator 1 remains stable, the alternating current outputted from the inverter circuit 39, as detected by the current detection circuit 40, will keep exhibiting a waveform of a sine wave with identical shapes as shown in FIG. 3a. Further, in this case, since all the sizes and shapes in the sine wave are identical, no turbulence is observed in the waveform detected, as shown in FIG. 3b.

Figure 4:
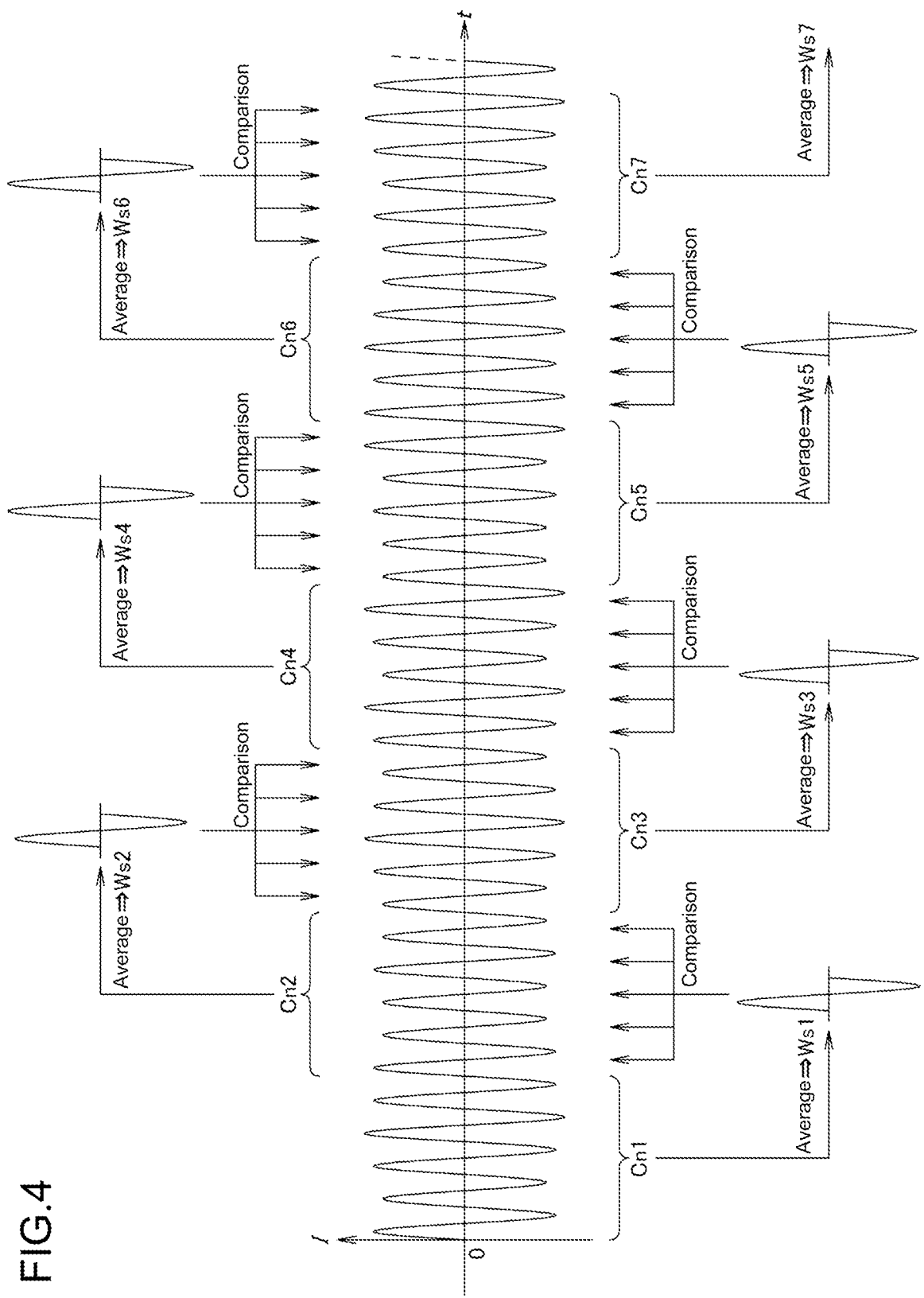
FIG. 4 is an explanatory diagram showing a current waveform exhibiting a relatively low level of turbulence, and showing a data processing flow based thereon, in the free piston Stirling refrigerator of the embodiment of the present invention.
Figure 6:
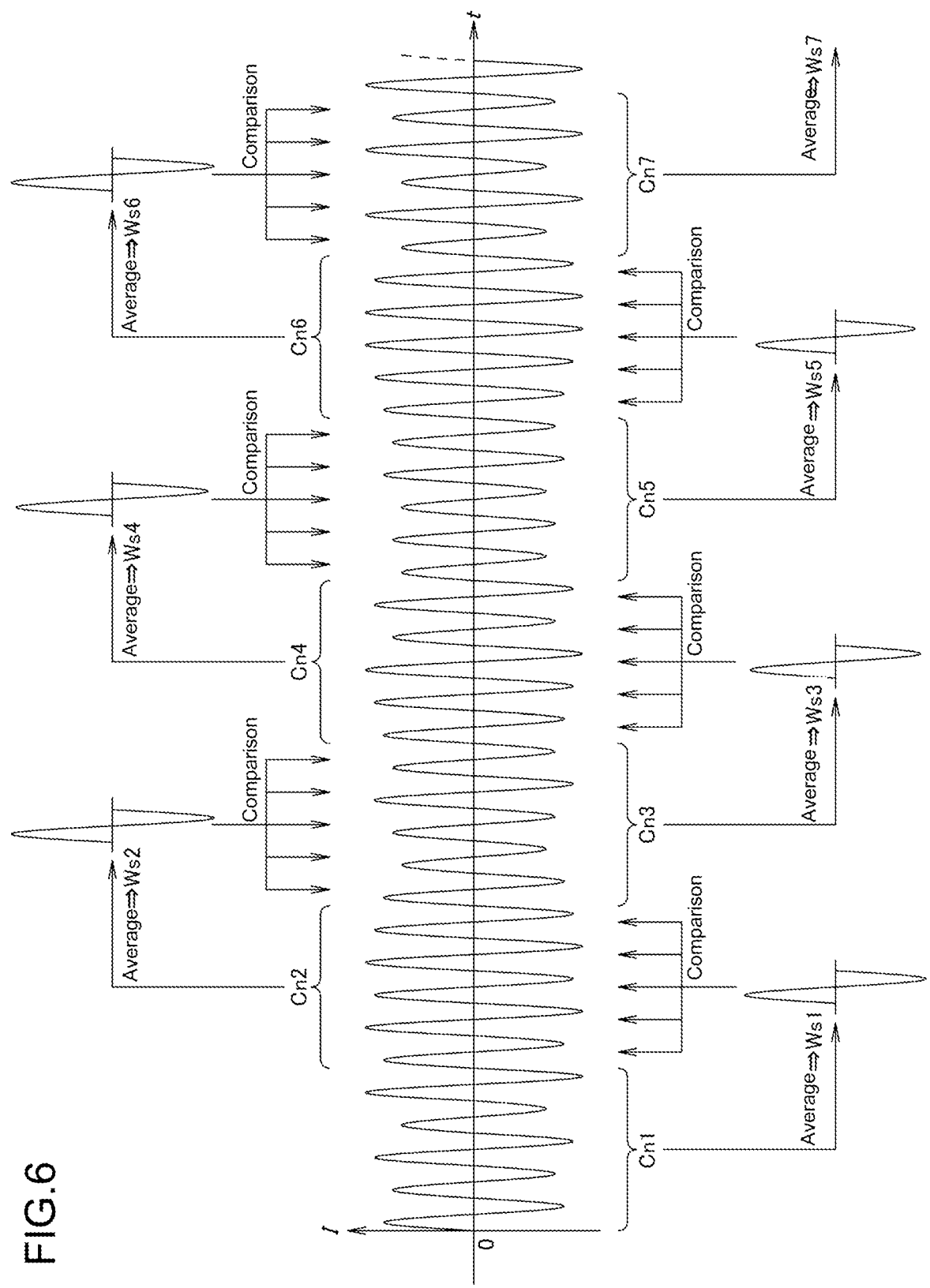
FIG. 6 is an explanatory diagram showing a current waveform exhibiting a relatively high level of turbulence, and showing a data processing flow based thereon, in the free piston Stirling refrigerator of the embodiment of the present invention.

However, as shown in FIG. 4 or 6, turbulence is observed to a certain extent in the actual alternating current detected by the current detection circuit 40. The applicant realized that the turbulence in the current waveform became more significant as the risk of hitting increased, and that the turbulence in the current waveform became even more significant as hitting started. The turbulence in the current waveform is defined by a difference value $\Delta I$ derived by comparing a reference waveform and the waveform detected. Here, the difference value $\Delta I$ may be a difference in area of the waveform(s), or simply a difference in amplitude. In each case, the difference value $\Delta I$ can be fairly easily calculated by a simple program. Further, by utilizing this phenomenon, hitting can be restricted without installing sensors for measuring various physical quantities, or calculating the positions of the piston 23 and the displacer 16.

Here, the current waveform under a stable operation state of the Stirling refrigerator 1 varies depending on, for example, an operating strength and temperature conditions therearound. Therefore, it is desired that the reference waveform be not determined preliminarily, but calculated by averaging the current waveforms under a state where the Stirling refrigerator 1 is operating substantially stably. Further, the waveform detected by the current detection circuit 40 changes as the temperature conditions or the like therearound change by continuously operating the Stirling refrigerator 1, or as the operating strength of the Stirling refrigerator 1 is adjusted. Thus, it is desired that the reference waveform be calculated on a periodic basis.

In a state where the operation of the Stirling refrigerator 1 has substantially stabilized, the control circuit 41 calculates a one cycle reference waveform Ws1 by averaging waveforms of first n cycles of an alternating current Cn1 detected by the current detection circuit 40. Here, n=5. Next, the control circuit 41 individually compares each of the next waveforms of five cycles of an alternating current Cn2 with the one cycle reference waveform Ws1, and then calculates a difference therebetween. At the same moment, the control circuit 41 calculates a one cycle reference waveform Ws2 by averaging waveforms of five cycles of the alternating current Cn2. Next, the control circuit 41 individually compares each of the waveforms of the next five cycles of an alternating current Cn3 with the reference waveform Ws2, and then calculates a difference therebetween. At the same moment, the control circuit 41 calculates a one cycle reference waveform Ws3 by averaging waveforms of five cycles of the alternating current Cn3. One cycle reference waveforms Ws4, Ws5, Ws6, Ws7 . . . are then calculated in a repetitive manner by averaging waveforms of five cycles of each of alternating currents Cn4, Cn5, Cn6, Cn7 . . . , thereby obtaining turbulences in the currents as shown in FIG. 5 or FIG. 7.

Figure 5:
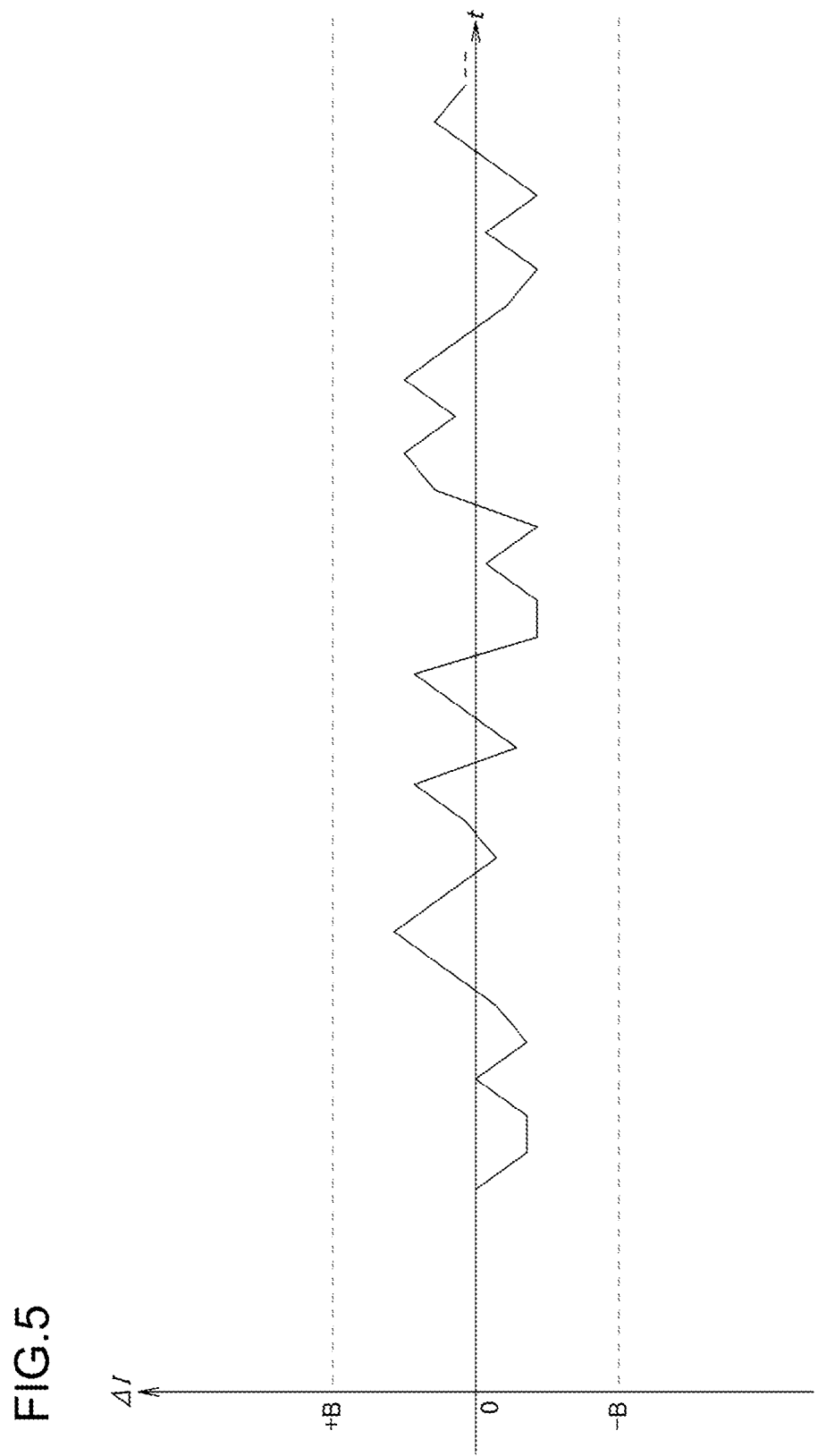
FIG. 5 is an explanatory diagram showing the turbulence in the current based on the waveform shown in FIG. 4 in the free piston Stirling refrigerator of the embodiment of the present invention.

As shown in FIG. 5, it is regarded as substantially stable, when the turbulence (difference value $\Delta I$) in the current waveform detected is within a range of +B to −B as reference values. However, as shown in FIG. 7, when the turbulence (difference value $\Delta I$) in the current waveform detected has deviated from the range of +B to −B as reference values, the control circuit 41 will restrict the output from the inverter circuit 39 in accordance with the degree of the deviation.

As described above, the free piston Stirling refrigerator 1 of the present invention has the casing 2; the cylinder 15 provided inside the casing 2; the piston 23 provided in a way such that the piston 23 is capable of reciprocating inside the cylinder 15; the linear motor 24 for reciprocating the piston 23; the displacer 16 reciprocating inside the cylinder 15 in conjunction with the reciprocation of the piston 23; and the control unit 38 for controlling the operation of the linear motor 24. Particularly, the control unit 38 has the inverter circuit 39 for generating an alternating current with a given frequency and then supplying the alternating current to the linear motor 24; the current detection circuit 40 for detecting the current outputted from the inverter circuit 39; and the control circuit 41 for controlling the output from the inverter circuit 39 based on the turbulence in the current detected by the current detection circuit 40. Thus, hitting can be restricted through an inexpensive configuration and a simple control.

Further, in the present invention, the control circuit 41 calculates the difference value $\Delta I$ by comparing the waveform detected by the current detection circuit 40 and the reference waveform per one cycle of the alternating current outputted by the inverter circuit 39, and this difference value $\Delta I$ is used as a reference for judging the turbulence in the current, thereby allowing hitting to be restricted via a simple calculation.

Furthermore, in the present invention, the control circuit 41 calculates the one cycle reference waveform by averaging waveforms of n cycles of an alternating current detected, thus allowing hitting to be restricted likewise in a stable manner even when a condition for stability varies due to, for example, an operating strength and surrounding temperatures.

Furthermore, in the present invention, the control circuit 41 compares the one cycle reference waveform Ws1 with each of the next waveforms of n cycles of the alternating current Cn2 detected that are subsequent to the waveforms of n cycles of the alternating current Cn1 serving as the basis for calculating the one cycle reference waveform Ws1, and calculates the next one cycle reference waveform Ws2 by averaging said waveforms of the next n cycles of the alternating current Cn2. In this way, hitting can be restricted likewise in a stable manner even when the condition for stability changes as a result of, for example, adjusting the operating strength or due to changes in surrounding temperatures or the like.

Here, the present invention is not limited to the above-mentioned embodiment; various modified embodiments are possible within the scope of the gist of the present invention. For example, in the above embodiment, although a single reference value is used to judge the turbulence in the current(s), reference values at multiple stages may be employed.

What is claimed is:

1. A free piston Stirling refrigerator comprising:
   a casing;
   a cylinder provided inside the casing;
   a piston provided in a way such that the piston is capable of reciprocating inside the cylinder;
   a linear motor for reciprocating the piston;
   a displacer reciprocating inside the cylinder in conjunction with the reciprocation of the piston; and
   a control unit for controlling an operation of the linear motor, wherein
   the control unit has:
      an inverter circuit for generating an alternating current with a given frequency and then supplying the alternating current to the linear motor;
      a current detection circuit for detecting the alternating current outputted from the inverter circuit; and
      a control circuit for controlling the alternating current outputted from the inverter circuit based on a turbulence in the alternating current that is detected by the current detection circuit, and
   the control circuit calculates a one cycle reference waveform by averaging waveforms of n cycles of the alternating current detected, compares the one cycle reference waveform with each of the next waveforms of n cycles of an alternating current detected that are subsequent to the waveforms of n cycles of the alternating current serving as the basis for calculating the reference waveform, and calculates the next one cycle reference waveform by averaging said next waveforms of n cycles of the alternating current.

2. The free piston Stirling refrigerator according to claim 1, wherein the control circuit calculates a difference value by comparing a waveform detected by the current detection circuit and a reference waveform per one cycle of the alternating current outputted by the inverter circuit, and the difference value is used as a reference for judging the turbulence in the alternating current.

* * * * *